United States Patent Office 3,573,250
Patented Mar. 30, 1971

3,573,250
FLUORINE-CONTAINING LINEAR POLYESTERS
Edward W. Pietrusza, Morristown, and Jack R. Pedersen, Parsippany, N.J., assignors to Allied Chemical Corporation, New York, N.Y.
No Drawing. Continuation-in-part of application Ser. No. 641,129, May 25, 1967. This application May 6, 1968, Ser. No. 727,016
Int. Cl. C08g 17/00, 39/00
U.S. Cl. 260—40
14 Claims

ABSTRACT OF THE DISCLOSURE

This specification discloses aromatic polyesters prepared from a dicarboxylic acid reactant comprised of at least 20 mol percent of 4,4'-dichlorocarbonyldiphenylsulfone and an aromatic dihydroxy reactant containing a fluorine-substituted bisphenol. The polyesters have high melt and decomposition temperatures which make them particularly useful as high temperature coatings, films, and molded articles.

FLUORINE-CONTAINING AROMATIC POLYESTERS

This application is a continuation-in-part of our copending application Ser. No. 641,129 filed May 25, 1967.

Aromatic polyesters and copolyesters derived from 4,4'-dichlorocarbonyldiphenylsulfone and an aromatic dihydroxy component wherein the hydroxy radicals are directly attached to a ring carbon atom have high melting points and high glass transition temperatures and form thermally resistant films, fibers and molded articles.

We have now discovered that aromatic polyesters and copolyesters derived from a dicarboxylic acid component which contains at least about 20 mol percent of 4,4'-dichlorocarbonyldiphenylsulfone and a fluorine-containing bisphenol component wherein the hydroxy radicals are directly attached to a ring carbon atom have surprisingly high melt and decomposition temperatures and high glass transition temperatures and can be formed into films and molded articles, used as high temperature coatings and the like. Various reinforcing agents can be added to the polyesters of the invention for particular high temperature applications. For example, glass fiber reinforced polyesters of the invention retain their excellent tensile properties at very high temperatures, e.g. about 200° C. and higher.

The fluorine-containing bisphenols suitable in the present invention have the formula

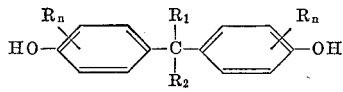

wherein $R_1$ and $R_2$ are independently selected from the group consisting of hydrogen, fluoroalkyl radicals of 1 to 5 carbon atoms wherein at least two fluorine atoms are attached to each carbon atom and the remaining substituents can be fluorine, hydrogen or chlorine and phenyl radicals and wherein at least one of the substituents $R_1$ and $R_2$ contain fluorine; R is a substituent which can be halogen or alkyl radicals of 1 to 5 carbon atoms and $n$ is an integer from 0 to 4.

Suitable bisphenols contemplated by this formula include for example:

2,2-bis(4-hydroxyphenyl)-1,1,3,3-tetrafluoropropane,
2,2-bis(4-hydroxyphenyl)hexafluoropropane,
2,2-bis(4-hydroxyphenyl)-1,1,3,3-tetrafluoro-1,3-dichloropropane,
2,2-bis(4-hydroxyphenyl)-1,1,1,3,3-pentafluoro-3-chloropropane,
2,2-bis(4-hydroxyphenyl)-1,1,1,3,3-pentafluoropropane,
2,2-bis(4-hydroxyphenyl)perfluorobutane,
3,3-bis(4-hydroxyphenyl)perfluoropentane,
2,2-bis(4-hydroxy-3-methylphenyl)hexafluoropropane,
2,2-bis(4-hydroxy-3-bromophenyl)hexafluoropropane,
2,2-bis(4-hydroxy-3-chlorophenyl)hexafluoropropane,
2,2-bis(4-hydroxy-3-t-butylphenyl),
1,1-bis(4-hydroxyphenyl)-1-trifluoromethyl-1-phenylmethane,
1,1-bis(4-hydroxyphenyl)-2,2,2-trifluoroethane
and the like. Mixtures of fluorine-containing bisphenols can also be employed.

In addition, other aromatic dihydroxy compounds can be substituted in part for the fluorine-substituted bisphenols described above such as 1,2-, 1,3- and 1,4-dihydroxybenzene, bis(4-hydroxyphenyl)dimethylmethane, 1,4-bis(p - hydroxycumyl)benzene, 4,4 - bis(hydroxyphenyl)sulfone and the like. Alternatively, an aliphatic dihydroxy compound can be substituted in part for the fluorine-substituted bisphenols such as a polymethylene glycol having from 2 to 10 carbon atoms, including ethylene glycol, 1,5-pentanediol, 1,10-decanediol and other glycols of this series, branched chain glycols such as 2,2-dimethyl-1,3-propanediol and the like, cyclic glycols such as 1,4-di(hydroxyethyl)-benzene and any of these glycols bearing one or more inert substituents thereon. In order to retain the high temperature properties of the fluorine-containing polyesters of the invention, no more than about 80 mol percent of the fluorine-substituted bisphenol component should be replaced by other aromatic or aliphatic dihydroxy compounds.

Copolyesters can also be prepared by substituting other aromatic or aliphatic dicarboxylic acids, or their halide, ester or anhydride derivatives, for the 4,4'-dichlorocarbonyldiphenylsulfone reactant in amounts of up to about 80 mol percent of the dicarboxylic acid component.

Suitable aromatic dicarboxylic acids useful for this purpose include for example phthalic acid, terephthalic acid, isophthalic acid, 4,4'-diphenylmethanedicarboxylic acid, 2,2-(4,4'-dicarboxydiphenyl)propane, and the like. Aliphatic dicarboxylic acids suitable in the invention include oxalic acid, adipic acid, sebacic acid, α,α-diethyl adipic acid, dodecanedioic acid and the like.

The polymers of the invention are prepared by reacting 4,4'-dichlorocarbonyldiphenylsulfone, alone or in admixture with a different dicarboxylic acid as hereinabove described, with an equimolar amount of a fluorine-substituted bisphenol, alone or in admixture with another dihydroxy compound, in a catalyzed solution. The mixture is reacted until evolution of hydrogen chloride has ceased. By varying the conditions of time and temperature and concentrations of starting materials, a wide range of fluorine-containing sulfone polyesters and copolyesters can be prepared of determinable molecular weight.

Equimolar amounts of the 4,4'-dichlorocarbonyldiphenylsulfone reactant and the dihydroxy reactant are preferred in our process since the presence of an excess of either reactant will act as a terminator for the polymerization reaction resulting in the formation of low molecular weight polyesters.

The solvent should be a solvent for both the 4,4'-dicholorcarbonyldiphenylsulfone reactant and the dihydroxy reactant and preferably for the resultant polyester, although this is not required. In general, aromatic hydrocarbons and halogenated aromatic hydrocarbons are solvents which may be employed in the process of the invention, including benzene, toluene, o-xylene, m-xylene, p-xylene, p-cymene, diphenylmethane, 1,3,5-triethylbenzene, chlorobenzene, o-dichlorobenzene, 1,2,4-trichlorobenzene, and the like. In general, the use of higher boiling solvents will result in the formation of higher molecular weight polymers.

The reactants can be heated in the absence of a catalyst, but the presence of a metal catalyst increases the rate of reaction. Particularly outstanding results were obtained using powdered magnesium as the catalyst.

The polymerization reaction proceeds readily at the reflux temperature of the reaction mixture which depends upon the boiling point of the solvent employed during polymerization. In general, the rate of polymerization will increase at higher temperatures of reaction.

The time required for the formation of high molecular weight polyester will vary depending upon the temperature of the reaction, the purity of the reactants and the choice of catalysts. The reactants and the solvent must be essentially free from impurities and water which cause degradative side reactions and chain termination and prevent the formation of high molecular weight polymer. Increasing the time of reaction increases the molecular weight of the resulting polymer with accompanying increases in glass transition temperature, flow temperature, and decomposition temperature.

The polymer product can be isolated in any convenient manner such as will be known to one skilled in the art. One convenient method is to filter off the catalyst and pour the reaction mixture into a nonsolvent for the polymer. The precipitated polymer can be further purified by washing and drying to remove solvent.

The polyesters and copolyesters of the invention are useful for high temperature applications and can be formed into films, molded articles and the like. In addition, composites comprising the polyesters of the invention and up to about 99% by weight of the polymer of a reinforcing agent can be prepared by conventional means. Suitable reinforcing agents include glass fibers and glass cloth, metal fibers, metal carbide whiskers and the like. Molded articles can be formed from the polyesters of the invention and up to about 80% by weight of the polyester of a suitable reinforcing agent.

The following examples are given to further illustrate the invention, but it is to be understood that the invention is not meant to be limited to the details disclosed therein.

In the examples all parts are by weight uness otherwise noted. The reduced viscosity of the polymers was determined as a 0.52% by weight solution in m-cresol at 25° C. Glass transition temperatures, referred to as $T_g$, and decomposition temperatures were determined by differential thermal analysis except when otherwise noted. The tensile property measurements reported were carried out using an Instron tensile tester operated at a constant speed crosshead separation of 0.5 inch per minute.

EXAMPLE 1

3.429 parts of 4,4'-dichlorocarbonyldiphenylsulfone, 3.0 parts of 2,2-bis(4-hydroxyphenyl)1,1,3,3-tetrafluoro-1,3-dichloropropane, $2.5 \times 10^{-2}$ part of powdered magnesium and 220 parts by volume of freshly distilled o-dichlorobenzene were charged to a reaction vessel fitted with a magnetic stirrer and a reflux condenser. The reaction mixture was refluxed until the evolution of hydrogen chloride ceased, about 50 hours, under nitrogen. The resultant mixture was filtered through glass wool to remove the catalyst and the solution poured into 500 parts by volume of methanol.

A white polymer product was isolated and dried. The polymer had a flow point range of 250–260° C., a reduced viscosity of 0.15 and $T_g$ of 190° C. The polymer did not decompose up to 300° C.

The polymer has recurring units of the formula

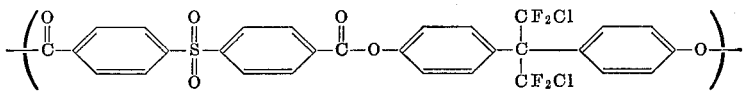

EXAMPLE 2

17.15 parts of 4,4'-dichlorocarbonyldiphenylsulfone, 15.4 parts of 2,2-bis(4-hydroxyphenyl)-1,1-trifluoroethane, 0.1 part of powdered magnesium and 400 parts by volume of o-dichlorobenzene were refluxed for 48 hours in a vessel as in Example 1. The mixture was filtered and the polymer product precipitated, isolated and dried as in Example 1.

The polymer product had flow point range of 285–295° C., a reduced viscosity of 0.41 and a $T_g$ of 225' C.

The polymer has recurring units of the formula

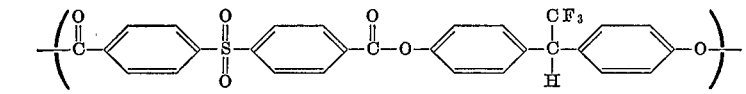

EXAMPLE 3

17.15 parts of 4,4'-dichlorocarbonyldiphenylsulfone, 17.2 parts of 1,1-bis(4-hydroxyphenyl)-1-trifluoromethyl-1-phenylmethane, 0.1 part of powdered magnesium and 400 parts by volume of o-dichlorobenzene were refluxed for 18 hours in a vessel as in Example 1. The solution was filtered and the product isolated and dried as in Example 1.

22.5 parts of polymer were obtained having a flow point of 340–350° C., a reduced viscosity of 0.45 and a $T_g$ of 265° C.

The results of thermogravimetric analysis at various temperatures in nitrogen and in air, expressed as percent weight loss, are given below:

| Atmosphere | 400° C. | 450° C. | 500° C. | 550° C. |
| --- | --- | --- | --- | --- |
| Nitrogen | 0.3 | 0.4 | 3.5 | 31.5 |
| Air | 0.2 | 0.5 | 7.0 | 37.0 |

The polymer product has recurring units of the formula

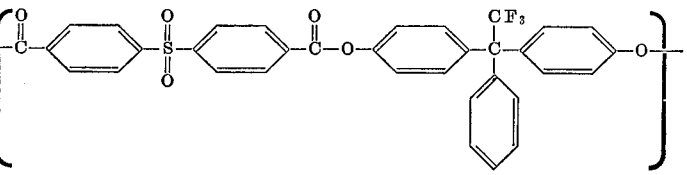

A 10% solution of the polymer in o-dichlorobenzene was prepared and divided into three portions. One portion was reserved, a small amount of oil of orange was added to the second portion and a small amount of titanium dioxide was added to the third portion. Three films were cast from the solutions by pouring onto a glass plate and evaporating the solvent. A clear film was obtained from the first solution, an orange film from the second, and a white film from the third solution.

The tensile properties of a clear cast film prepared as above were determined at room temperature and at an elevated temperature. The results are given below:

| Temperature, °C. | Ultimate elongation, percent | Ultimate tensile strength, p.s.i. | 2% secant modulus, p.s.i. |
|---|---|---|---|
| 23 | 16 | 11,500 | 205,000 |
| 230 | 6 | 3,700 | 100,900 |

EXAMPLE 4

17.15 parts of 4,4'-dichlorocarbonyldiphenylsulfone, 16.8 parts of 2,2-bis(4-hydroxyphenyl)perfluoropropane, 0.1 part of powdered magnesium and 400 parts by volume of o-dichlorobenzene were charged to a vessel and refluxed for 21 hours as in Example 1. The solution was filtered and the polymer product isolated and dried following the procedure given in Example 1.

27.5 parts of a fine, white product were obtained. The polymer had a flow point of 310–320° C., a reduced viscosity of 0.34 and a $T_g$ of 250° C.

The polymer has recurring units of the formula

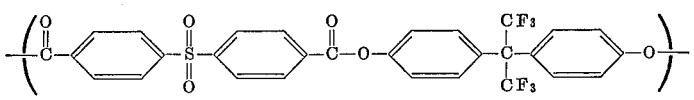

A brittle, opaque film was cast from a solution of the polymer in o-dichlorobenzene.

Thermogravimetric analysis of the polymer was made under a nitrogen atmosphere and in air. The percent weight loss at various temperatures is given below:

| Atmosphere | 400° C. | 450° C. | 500° C. | 550° C. |
|---|---|---|---|---|
| Nitrogen | 0 | 0.5 | 7.0 | 38.0 |
| Air | 0 | 1.5 | 10.5 | 43.0 |

Comparison to an analogous polymer prepared from 4,4' - dichlorocarbonyldiphenylsulfone and 2,2 - bis(4-hydroxyphenyl)propane demonstrates that the fluorine-containing polymer has a higher resistance to elevated temperatures. The thermogravimetric analysis results from the nonfluorine-containing polymer are given below:

| Atmosphere | 400° C. | 450° C. | 500° C. | 550° C. |
|---|---|---|---|---|
| Nitrogen | 1.0 | 2.5 | 29.0 | 54.0 |
| Air | 2.0 | 7.5 | 32.0 | 49.0 |

EXAMPLE 5

34.3 parts of 4,4'-dichlorocarbonyldiphenylsulfone, 16.8 parts of 2,2-bis(4-hydroxyphenyl)perfluoropropane, 17.2 parts of 1,1 - bis(4-hydroxyphenyl) - 1 - trifluoromethyl-1-phenylmethane, 0.2 part of powdered magnesium and 650 parts by volume of o-dichlorobenzene were charged to a vessel as in Example 1 and refluxed for 24 hours. A small portion of the mixture was taken off and the remainder refluxed for 24 hours longer. The catalyst was filtered and the polymer products isolated and dried.

The first sample had a reduced viscosity of 0.25 and a $T_g$ of 220° C.

The second sample had a higher reduced viscosity of 0.46, a melt flow of 325–340° C. and a $T_g$ of 255° C.

The results of thermogravimetric analysis on the second copolymer expressed as percent weight loss at various temperatures is given below:

| Atmosphere | 400° C. | 450° C. | 500° C. | 550° C. |
|---|---|---|---|---|
| Nitrogen | 0.3 | 0.5 | 5.0 | 38.0 |
| Air | 0.5 | 1.0 | 9.0 | 39.0 |

A portion of the second polymer was dissolved in o-dichlorobenzene and a film was cast on a glass plate. The film had the following tensile properties:

| Temperature, °C. | Ultimate elongation, percent | Ultimate tensile strength, p.s.i. | 2% secant modulus, p.s.i. |
|---|---|---|---|
| 23 | 15 | 10,700 | 139,400 |
| 230 | 11 | 4,100 | 96,300 |

EXAMPLE 6

34.3 parts of 4,4'-dichlorocarbonyldiphenylsulfone, 20.3 parts of isophthaloyl chloride, 67.2 parts of 2,2-bis(4-hydroxyphenyl)perfluoropropane, 0.4 part of powdered magnesium and 800 parts by volume of o-dichlorobenzene were refluxed for 20 hours. The copolymer product was isolated and dried following the procedure of Example 1.

The copolymer had a reduced viscosity of 0.52, a melt flow of 290–310° C. and a $T_g$ of 220° C.

A film was cast from a solution in o-dichlorobenzene. Tensile properties are given below:

| Temperature, °C. | Ultimate elongation, percent | Ultimate tensile strength, p.s.i. | 2% secant modulus, p.s.i. |
|---|---|---|---|
| 23 | 37 | 11,000 | 163,300 |
| 200 | 230 | 5,000 | 114,400 |

A sheet was compression molded from the above polymer and tensile properties determined. The results are given below:

| Temperature, °C. | Ultimate elongation, percent | Ultimate tensile strength, p.s.i. | 2% secant modulus, p.s.i. |
|---|---|---|---|
| 23 | 26 | 11,200 | 77,000 |
| 200 | 10 | 5,400 | 64,000 |

Test specimens of the molded sheet were heated for 43 hours in an air oven at 200° C. and cooled to room temperature. The ultimate elongation was 10%, ultimate tensile strength 16,000 p.s.i. and 2% secant modulus 214,300 p.s.i.

39 parts of the copolymer prepared above were dissolved in 200 parts by volume of o-dichlorobenzene. Various amounts of ¼″ glass fibers which had been previously washed with hot methanol and hot o-dichlorobenzene were added. The polymer was isolated and dried as in Example 1.

Samples of the glass reinforced copolymer were compression molded at 315° C. and tensile properties determined. The results are summarized below:

| Percent by weight of glass | Temp. °C. | Ultimate elongation, percent | Ultimate tensile strength, p.s.i. | 2 secant modulus, p.s.i. |
|---|---|---|---|---|
| 20 | 23 | 8 | 13,900 | 244,350 |
|  | 200 | 9 | 9,100 | 151,300 |
| 37 | 23 | 15 | 16,100 | 218,600 |
|  | 200 | 14 | 14,200 | 199,500 |
| 50 | 23 | 10 | 24,700 | 380,700 |
|  | 200 | 11 | 28,900 | 446,500 |
| 70 | 23 | 14 | 21,500 | 399,200 |
|  | 200 | 12 | 23,600 | 386,000 |
| 100 | 23 | 5 | 10,400 |  |
|  | 200 |  | 7,700 |  |

It will be apparent that numerous variations and modifications may be effected without departing from the novel concepts of the present invention, and the illustrative details disclosed are not to be construed as imposing undue limitations on the invention.

We claim:

1. A fluorine-containing aromatic film forming polyester consisting essentially of a condensation reaction product of equimolar amounts of (A) a dicarboxylic acid reactant comprising from 100 to about 20 mol percent of 4,4'-dichlorocarbonyldiphenylsulfone and from 0 to about 80 mol percent of a different dicarboxylic acid reactant with (B) a bisphenol reactant containing fluorine comprising from 100 to about 20 mol percent of one or more fluorine-containing bisphenols of the formula

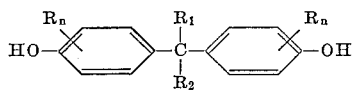

wherein $R_1$ and $R_2$ are independently selected from the group consisting of hydrogen, phenyl and fluoroalkyl radicals of 1 to 5 carbon atoms wherein at least two fluorine atoms are attached to each carbon atom and the remaining substituents can be hydrogen, fluorine or chlorine; and wherein at least one of the groups $R_1$ and $R_2$ contains fluorine; R at each occurrence is a substituent selected from the group consisting of halogen and alkyl radicals of 1 to 5 carbon atoms; and $n$ is an integer from 0 to 4, and from 0 to 80 mol percent of a different dihydroxy compound.

2. A polyester according to claim 1 wherein said bisphenol reactant comprises a mixture of two or more fluorine-containing bisphenols as described.

3. A polyester according to claim 1 wherein said dicarboxylic acid reactant in addition to 4,4-dichlorocarbonyl-diphenylsulfone contains from about 1 to about 80 mol percent of a different dicarboxylic acid reactant.

4. A polyester according to claim 1 wherein said dicarboxylic acid reactant in addition to 4,4'-dichlorocarbonyldiphenylsulfone contains from about 1 to about 80 mol percent of an aromatic dicarboxylic acid reactant.

5. A polyester according to claim 4 wherein said aromatic dicarboxylic acid reactant is isophthaloyl chloride.

6. A linear aromatic film forming polyester consisting essentially of units of the formula

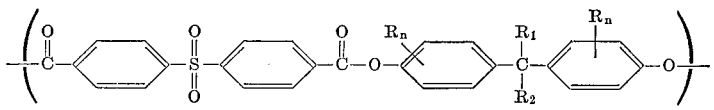

wherein $R_1$ and $R_2$ are independently selected from the group consisting of hydrogen, phenyl and fluoroalkyl radicals of 1 to 5 carbon atoms wherein at least two fluorine atoms are attached to each carbon atom and the remaining substituents can be hydrogen, fluorine or chlorine, and wherein at least one of the groups $R_1$ and $R_2$ contains fluorine; R at each occurrence is a substituent selected from the group consisting of halogen and alkyl radicals of 1 to 5 carbon atoms; and $n$ is an integer from 0 to 4.

7. A film forming polyester consisting essentially of units of the formula

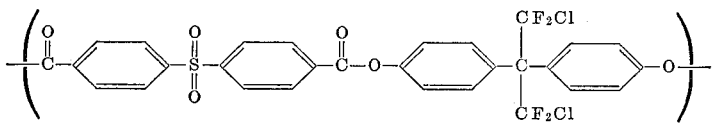

8. A film forming polyester consisting essentially of units of the formula

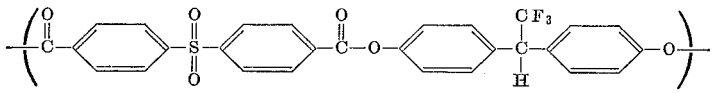

9. A film forming polyester consisting essentially of units of the formula

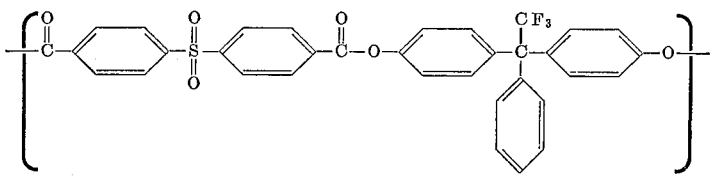

10. A film forming polyester consisting essentially of units of the formula

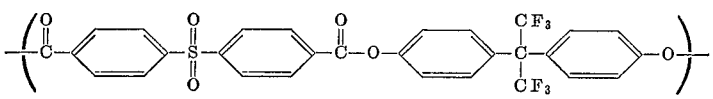

11. A film formed from the polyester of claim 1.

12. A composite formed from polyester of claim 1 containing from about 1 to about 99% by weight of the polyester of a reinforcing agent selected from the groups consisting of glass fibers, glass cloth, metal fibers and metal carbide whiskers.

13. A mold article formed from the polyester of claim 1 containing from 1 to about 80% by weight of the polyester of a reinforcing agent selected from the group consisting of glass fibers, glass cloth, metal fibers and metal carbide whiskers.

14. A molded article according to claim 13 wherein said reinforcing agent is glass fibers.

References Cited
UNITED STATES PATENTS

| | | | |
|---|---|---|---|
| 3,028,364 | 4/1962 | Conix et al. | 260—47 |
| 3,297,633 | 1/1967 | Hindersinn et al. | 260—47 |

FOREIGN PATENTS

| | | |
|---|---|---|
| 132,403 | 10/1960 | Russia. |

OTHER REFERENCES

Vinogradova et al.: Dokl. Akad. Nauk SSSR 164, 563–6 (1965) (Chem. Abstr. supplied).

Korshak et al.: Izv. Akad. Nauk SSSR, Ser. Khim. 1965, 1649–54 (C. A. supplied).

Korshak et al.: Vysokomolecul. Soedin. 7, 1689–92 (1965) (C. A. supplied).

WILLIAM H. SHORT, Primary Examiner

M. GOLDSTEIN, Assistant Examiner

U.S. Cl. X.R.

260—49